United States Patent [19]
Baldwin

[11] 3,764,900
[45] Oct. 9, 1973

[54] ELECTROLYTIC ELECTRICAL FIELD MAPPING DEVICE

[75] Inventor: Keith M. Baldwin, Hancock, Mich.

[73] Assignee: Board of Control of Michigan Technological University, Houghton, Mich.

[22] Filed: Feb. 3, 1972

[21] Appl. No.: 223,085

[52] U.S. Cl. .................... 324/71 R, 324/29, 324/72, 33/1 M, 35/19 A
[51] Int. Cl. ..................... G01r 29/14, G01r 19/08
[58] Field of Search ...................... 324/71 R, 72, 29; 33/1 M; 346/33; 235/61.6 B; 35/19 A

[56] References Cited
UNITED STATES PATENTS

| | | | |
|---|---|---|---|
| 2,542,478 | 2/1951 | Clark | 324/71 R |
| 2,542,490 | 2/1951 | Ehrenfried | 324/71 R |
| 2,963,794 | 12/1960 | Peck | 33/1 M |
| 3,422,538 | 1/1969 | Panissidi | 33/1 M |

*Primary Examiner*—Rudolph V. Rolinec
*Attorney*—John W. Michael et al.

[57] ABSTRACT

The device includes a plotting board which overlies an electrolyte tank and on top of which a sheet of graph paper is positioned for plotting the electrical field distribution between electrodes immersed in the electrolyte. A movable, exploratory probe assembly, including a stylus extending into the electrolyte, is slidably mounted on a pair of perpendicularly crossing guide rods located beneath the plotting board. The guide rods are connected to correspondingly corssing arms, which are positioned above the plotting board and are slidably mounted thereto so that movement of the arms in the x and y directions produces corresponding movement of the exploratory stylus. Each arm has an elongated slot which always intersect directly above the exploratory stylus as the arms (and thus the exploratory stylus) are moved to locate a null point. When a null point is detected, its location can be recorded directly onto the graph paper by inserting a pencil, ball point or the like through the opening provided by the intersecting slots.

In a preferred embodiment, the arms and guide rods are connected at their opposite ends to guide members which slide along the inside edges of elongated slots provided in the plotting board adjacent the edges of the graph paper. These guide members are connected together via a cable and pulley arrangement to insure easy, smooth, and accurate movement of the arms and rods while searching for null points.

8 Claims, 2 Drawing Figures

PATENTED OCT 9 1973

3,764,900

ELECTROLYTIC ELECTRICAL FIELD MAPPING DEVICE

BACKGROUND OF THE INVENTION

This invention relates to electrical field mapping devices.

Field mapping is used in the study of electrical and magnetic fields for instructional and industrial design purposes (e.g. electron tube design). Also, electrical field analogy can be used as an aid in constructing flow nets for problems in heat transfer, fluid and air flow patterns, etc. The use of electrolytic devices for this purpose is well known. These devices employ a pair of electrodes which are immersed into an electrolytic solution contained in a tank. Successive null point readings, i.e. equipotential points, are taken at various points between the electrodes. These devices are relatively inexpensive to fabricate and operate and are very reliable. However, when a permanent record is desired, it is necessary to plot and translate the readings into lines on graph paper or the like. This transfer of the null point coordinates is relatively tedious and time consuming and introduces the possibility of error.

In an attempt to overcome this disadvantage, mapping devices have been developed which employ a resistive sheet, such as a conductive paper, with electrodes mounted in electrical contact with a sheet. The null points are determined by moving an exploratory probe in contact with the surface of the sheet across the region between the electrodes. When the null points have been ascertained, the point of the probe is pressed against the sheet to record the point. U.S. Pat. No. 2,542,478 describes a device of this type. U.S. Pat. No. 2,612,627 describes an electrolytic field mapping device which automatically plots the equipotential lines onto a sheet positioned on a plotting board located adjacent to the electrolytic tank.

Although eliminating the necessity for transferring the null point coordinates to graph paper for recordation, these devices have several shortcomings. The resistive sheet used in the device described in U.S. Pat. No. 2,542,478 is considerably more expensive than ordinary graph paper so its use as a recording medium increases operational costs. This cost can be reduced by using a sheet of graph paper and superimposed sheet of carbon paper which is placed beneath the resistive sheet. Additional pressure applied to the probe, when a null point is ascertained, causes the point to be recorded on the graph paper via the carbon paper. Thus, the resistive sheets can be used for more than one mapping operation. Since the probe is moved in sliding contact with the surface of the resistive sheet while exploring for the various null points, there is considerable wear to the sheet with a resultant adverse effect on the uniformity of its resistivity. Hence, the relatively expensive conductive sheet must be replaced frequently to preclude erroneous readings from the non-uniform resistivity.

The automatic plotting device described in U.S. Pat. No. 2,612,677 is very complex and expensive. Also, it is not readily adaptable to being manipulated manually which may be desirable for instructional purposes.

SUMMARY OF THE INVENTION

The primary object of this invention is to provide an electrolytic field mapping device which is arranged so the null point coordinates can be recorded directly onto graph paper or the like.

For achievement of this and other objects, this invention proposes providing an arrangement whereby the movable exploratory probe is carried by a tracer means located above a plotting board which is in turn positioned above the electrolyte tank and on top of which a recording medium, such as a sheet of graph paper or the like, is held. Movement of the tracer means in the x and y directions over the recording medium provides a corresponding movement of the exploratory probe in the electrolyte tank. The tracer means is arranged so that, as it is moved, a small opening is alway located directly above the exploratory probe stylus. When a null point is detected, a recording instrument, much as a pencil, ball point pen or the like, can be inserted through that opening to record the location of the null point directly onto the recording medium.

In a preferred embodiment, the tracer means comprises a pair of slotted, perpendicularly crossing arms which are slidably mounted on the plotting board so one can be moved in the x direction and the other in the y direction. These arms are connected to the exploratory probe and arranged so that the intersection of their slots provides a small opening which is always directly above the exploratory probe stylus.

DESCRIPTION OF THE PREFERRED EMBODIMENTS

Figure 1:
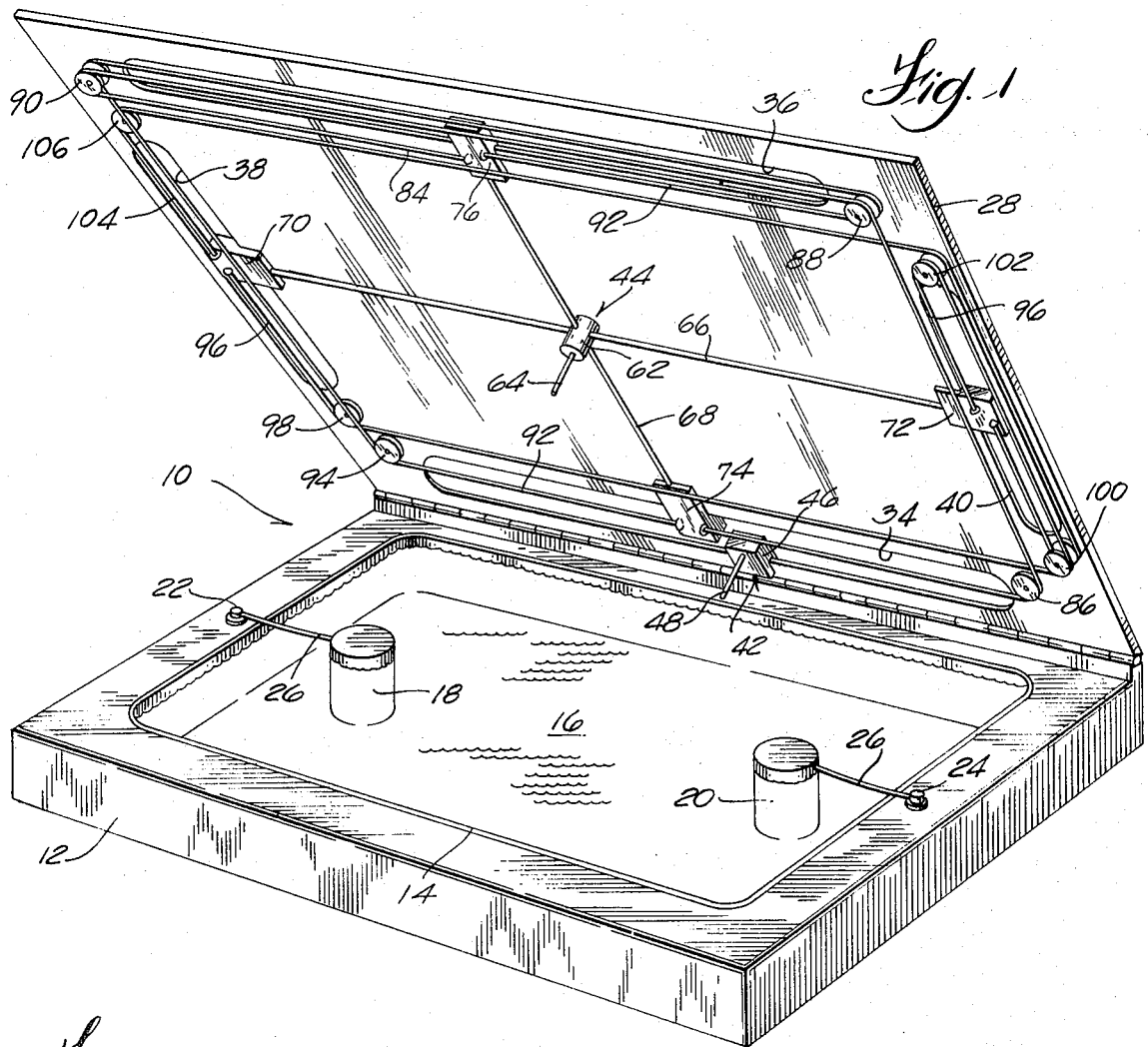
FIG. 1 is a perspective view of an electrolytic field mapping device of this invention shown with the plotting board in a raised position.
Figure 2:
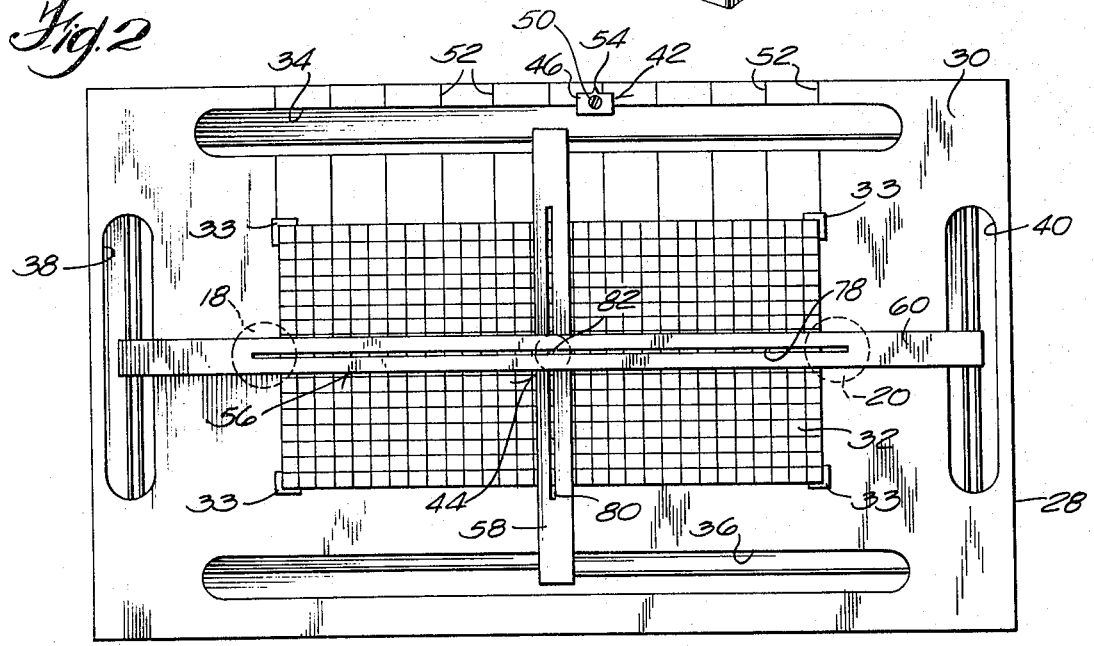
FIG. 2 is a top plan view of the electrolytic field mapping device of this invention.

Electrolytic field mapper 10 includes a platform 12 holding a removable tank 14 into which a conventional electrolyte solution 16 can be introduced. A pair of spaced, removable electrodes 18, 20, arranged in a configuration for which a field map is to be plotted, are located in tank 14 and immersed in electrolyte solution 16. Electrodes 18, 20 are electrically connected to terminals 22, 24, respectively, via leads 26, 26. A conventional signal generator (not shown) is attached to terminals 22, 24 in a conventional manner to provide a voltage across the electrodes. Plotting board 28, which normally overlies electrolyte tank 14, is hinged along one edge to platform 12 so it can be raised (as shown in FIG. 1) to gain access to the electrolyte tank and electrodes. Plotting board 28 has a flat, top surface 30 on which a sheet of ordinary graph paper 32 is positioned, as shown in FIG. 2. A template (not shown), which has cut-outs corresponding to the geometry and spacing of the electrodes, is used to trace the geometry of the electrodes onto graph paper 32. Graph paper 32 is positioned in paper guides 33, which are located on the plotting board to insure correspondence between the location of the electrodes and their tracing on the graph paper.

A pair of elongated longitudinal slots 34, 36 and a pair of elongated lateral slots 38, 40 are provided in plotting board 28 to accommodate the movement of reference probe assembly 42 and exploratory probe assembly 44. Reference probe assembly 42 has a guide member 46 which is slidably mounted over the outside edge of longitudinal slot 34 and carries a stylus 48. Stylus 48 extends into electrolyte solution 16 when the plotting board is in its normal position closed over tank 14. Reference probe assembly 42 can be clamped into place at various locations along the edge of electrolyte tank 14 by tightening set screw 50 into engagement with the top surface of the plotting board. Evenly-spaced markings 52 on the surface of plotting board 28 are used for setting the reference probe assembly at positions for making the null point determinations for any particular equipotential line. For example, if it is desired to plot the middle equipotential line, the reference probe is set so that pointer 54 corresponds to the marking half way between the electrodes. When it is desired to plot other equipotential lines, the reference assembly is set with the pointer corresponding to the appropriate mark.

Exploratory probe 44 is carried by tracer assembly 56 which includes a pair of perpendicularly crossing arms 58, 60 overlying graph paper 32. Movement of arms 58 and 60 in the $x$ and $y$ directions, respectively, moves the exploratory probe assembly in the corresponding direction as described hereinafter. Exploratory probe assembly 44 has a holder 62 which carries stylus 64. Stylus 64 extends into electrolyte solution 16 when the plotting board is in its normal position. Holder 62 is slidably mounted on perpendicularly crossing guide rods 66, 68 with the inner end of stylus 64 riding in electrical contact with guide rod 68. The holder is made from a dielectric material, preferably a low friction material such as Teflon, so it will slide easily on the guide rods. The opposite ends of guide rod 66 are attached to guide members 70, 72, which are slidably mounted over the inside edges of lateral slots 38 and 40, respectively. The opposite ends of guide rod 68 are attached to guide members 74, 76, which are slidably mounted over the inside edges of longitudinal slots 34 and 36, respectively.

Longitudinal arm 60, which has an elongated slot 78, extends between and is fastened at its opposite ends to the top side of guide members 70 and 72. Lateral arm 58, which is located beneath arm 60 and has an elongated slot 80, extends between and is fastened at its opposite ends to the top side of guide members 74 and 76. Movement of arm 58 in the $x$ direction or arm 60 in the $y$ direction moves the corresponding guide rods 66 and-/or 68. When one guide rod is moved by moving its corresponding arm, holder 62 is moved therewith and slides along the other guide rod so that the intersection of slots 78 and 80 is always directly above exploratory stylus 64. The intersecting slots 78 and 80 define an opening 82 which is used in marking the graph paper, as will be described hereinafter. Arms 58 and 60 are spaced a small distance above the top surface of the plotting board so they can be moved back and forth without catching on the edges of graph paper 32. Arms 58, 60 are preferably made from a transparent material, such as a clear plastic, so the graph paper coordinates underneath them can be observed.

Guides 70, 72, 74, 76 are slidably mounted on the plotting board in a manner so that arms 58 and 60 are always at right angles to each other during movement and can be moved easily and smoothly while searching for null points. In furtherance of this end, the guides for each of the arms are preferably connected together through a pulley and cable system as shown in FIG. 1. As viewed in FIG. 1, the right side of guide member 74 is connected to the left side of guide member 76 by cable 84 which is trained over single-sheaved pulley 86, the outer sheave of double-sheaved pulley 88, and the outer sheave of double-sheaved pulley 90. The left side of guide member 74 is connected to the right side of guide member 76 by cable 92, which is trained over single-sheaved pulley 94, the inner sheave of double-sheaved pulley 90 and the inner sheave of double-sheaved pulley 88. The lower side of guide member 70 (as viewed in FIG. 1 of the drawing) is connected to the upper side of guide member 72 by cable 96, which is trained over single-sheaved pulley 98, the outer sheave of double-sheaved pulley 100 and the outer sheave of double-sheaved pulley 102. The upper side of guide member 70 is connected to the lower side of guide member 72 by cable 104, which is trained over single-sheaved pulley 106, the inner sheave of double-sheaved pulley 102 and the inner sheave of double-sheaved pulley 100. Thus, it can be seen that as, for example, arm 60 is moved upwardly in FIG. 2, the extensions of cables 96 and 104 between guides 72, 70 and pulleys 102, 106 are shortened while the extensions of cables 96 and 104 between guides 70, 72 and pulleys 98 and 100 are lengthened a corresponding amount. This arrangement prevents the guide members from becoming "cocked" during movement of their respective arms. Hence, the guide members do not bind against the inside edge of the slots in the plotting board and smooth and accurate movement of the arms is insured. Also, the longitudinal axes of arms 58 and 60 are always maintained substantially at a right angle with each other and the longitudinal and lateral axes of the plotting board, respectively.

A conventional null point detector means (not shown) is connected between reference stylus 48 and exploratory stylus 64 (via guide rod 68) to detect null points as the exploratory stylus is moved about in the electrolyte solution within the region between electrodes 18 and 20 by movement of arms 58 and 60. For example, when an audio frequency voltage is applied between the electrodes, a head receiver can be used as the detector means, in which case a null point is indicated when no signal is detected on the head receiver.

To plot the electrical field between the electrodes, reference probe assembly 42 is set so that pointer 54 coincides with the appropriate mark 52 for the equipotential line desired to be plotted. Arms 58 and 60 are moved in the $x$ and $y$ directions, respectively, so that opening 82 at the intersection of slots 78, 80 is in the general area of the equipotential line being plotted. As a null point is detected, its location is recorded on graph paper 32 by inserting a pencil, ball point pen or the like in opening 82 (which is directly above exploratory stylus 64) to mark the point on the graph. Other points along the equipotential line are found in a similar manner. The reference probe assembly is then moved to another mark and an appropriate adjustment is made to the potential applied across the electrodes in a conventional manner. An equipotential line is then plotted as described above. After several equipotential lines have been plotted in this manner, the field lines can then be sketched according to well-known geometrical relationships, i.e. the field lines cross the equipotential lines at right angles and each mesh of the net formed thereby is nearly as square as possible.

From the above detailed description, it can be seen that this invention provides an improved electrolytic field plotting device whereby the null points can be quickly recorded as they are detected. The laborious and time-consuming task of transferring each null point coordinates and the possibility of introducing error during this transfer are eliminated. As will be readily apparent to those skilled in the art, various alterations and modifications can be made to the preferred embodiment described without departing from the spirit and scope of the invention.

I claim:

1. In an electrolytic field mapping device for mapping equipotential lines which includes spaced electrodes immersed in an electrolyte solution contained in a tank, means for applying a predetermined voltage across the electrodes, and means for detecting null points along said equipotential lines, the improvement comprising in combination:
a plotting board having a planar top surface overlying said electrolyte tank;
a recording medium positioned on the top surface of said plotting board above said electrodes;
a reference probe assembly including a reference probe which extends into said electrolyte solution;
means for selectively positioning said reference probe assembly in fixed positions at various locations in said electrolyte tank;
a movable exploratory probe assembly positioned beneath said plotting board and including an exploratory stylus which extends into said electrolyte solution, said detecting means being connectable between said reference and exploratory styli; and
tracer means for moving said exploratory stylus in the $x$ and $y$ directions within the region between said electrodes including
first and second elongated movable arms which are positioned above said recording medium and cross each other, said arms being slidably mounted on said plotting board at locations remote from said recording medium,
means for connecting said arms to said exploratory probe assembly so that movement of said first arm in the $y$ direction produces a corresponding movement of said exploratory stylus in the $y$ direction and movement of said second arm in the $x$ direction produces a corresponding movement of said exploratory stylus in the $x$ direction, and
means defining an elongated slot extending along the longitudinal axis of each of said arms, said slots intersecting to define an opening which remains in vertical axial alignment with said exploratory stylus during movement of said arms and into which a recording instrument can be inserted to record, directly on said recording medium, the location of null points detected by said detecting means.

2. The device according to claim 1 including
a first guide rod positioned beneath said plotting board and connected at its opposite ends to said first arm;
a second guide rod positioned beneath said plotting board and connected at its opposite ends to said second arm; and
a holder carrying said exploratory stylus and being slidably mounted on said first and second guide rods whereby movement of said first arm in the $y$ direction moves said holder along said second guide rod and movement of said second arm in the $x$ direction moves said holder along said first guide rod.

3. The device according to claim 2 wherein said plotting board includes
a pair of opposed, spaced, elongated lateral slots, one being located adjacent one side edge of said recording medium and the other being located adjacent the opposite side edge of said recording medium; and
a pair of opposed, spaced, elongated longitudinal slots, one being located adjacent an end edge of said recording medium and the other being located adjacent the opposite end edge of said recording medium; the opposite ends of one of said arms being guided along the inside edges of said lateral slots and the opposite ends of the other of said arms being guided along the inside edges of said longitudinal slots.

4. The device according to claim 3 wherein said reference probe assembly includes
guide means which is guided over the outside edge of one of said slots; and
clamping means for selectively clamping said reference probe assembly in fixed positions at various locations along the corresponding edge of said electrolyte tank.

5. The device according to claim 4 wherein said first and second arms are constructed from a transparent material.

6. The device according to claim 2 wherein the opposite ends of said first and second arms are connected together by a plurality of cables trained over a plurality of pulleys mounted on the underside of said plotting board; said pulleys and cables being arranged so the longitudinal axis of said first arm is always maintained substantially at a right angle with the lateral axis of said plotting board during its movement in the $y$ direction and the longitudinal axis of said second arm is always maintained substantially at a right angle with the longitudinal axis of said plotting board during its movement in the $x$ direction.

7. The device according to claim 6
wherein said cables and pulleys are arranged generally around the outside of the area of movement of said arms, rods and exploratory stylus
and wherein each cable is trained over said pulleys such that, with respect to the direction of movement of said arms and rods, each cable extend in a given direction from one side of one end of one of said arms and is connected to the opposite end of that arm but extends oppositely therefrom with respect to said given direction so that as said arm is moved the cable extension from opposite ends thereof are lengthened and shortened corresponding amounts to maintain accurate $x$ and $y$ movement of said arms.

8. A device according to claim 2 wherein
one of said guide rods is electrically conductive,
said detective means is electrically connected to said conductive guide rod, and
said exploratory probe stylus is in slidable electrical contact with said conductive guide rod during movement of said exploratory probe assembly.

* * * * *